United States Patent
Berthomieu et al.

(10) Patent No.: US 9,821,785 B2
(45) Date of Patent: Nov. 21, 2017

(54) VACUUM BRAKE BOOSTER PROVIDED WITH TUBES FOR FIXING SCREWS TO PASS THROUGH AND METHOD FOR PRODUCING SAME

(71) Applicant: Robert Bosch GmbH, Stuttgart (DE)

(72) Inventors: Bruno Berthomieu, Gava (ES); Joan Simon Bacardit, Barcelona (ES)

(73) Assignee: Robert Bosch GmbH, Stuttgart (DE)

( * ) Notice: Subject to any disclaimer, the term of this patent is extended or adjusted under 35 U.S.C. 154(b) by 370 days.

(21) Appl. No.: 14/648,607

(22) PCT Filed: Nov. 29, 2013

(86) PCT No.: PCT/EP2013/075168
§ 371 (c)(1),
(2) Date: May 29, 2015

(87) PCT Pub. No.: WO2014/083183
PCT Pub. Date: Jun. 5, 2014

(65) Prior Publication Data
US 2015/0314766 A1    Nov. 5, 2015

(30) Foreign Application Priority Data
Nov. 30, 2012   (FR) .................................. 12 61464

(51) Int. Cl.
*B60T 13/56*   (2006.01)
*B60T 13/567*  (2006.01)
(Continued)

(52) U.S. Cl.
CPC ........ *B60T 13/567* (2013.01); *B60T 13/5675* (2013.01); *F16B 4/004* (2013.01);
(Continued)

(58) Field of Classification Search
CPC ........................... B60T 13/567; B60T 13/5675
(Continued)

(56) References Cited

U.S. PATENT DOCUMENTS 5,411,299 A * 5/1995 Wagner ................... F16L 41/08
285/189
5,487,327 A * 1/1996 Schluter ................. B60T 13/565
92/128
(Continued)

FOREIGN PATENT DOCUMENTS
EP        2 058 195 A1     5/2009

OTHER PUBLICATIONS
International Search Report corresponding to PCT Application No. PCT/EP2013/075168, dated Jun. 24, 2014 (French and English language document) (5 pages).

*Primary Examiner* — Thomas E Lazo
(74) *Attorney, Agent, or Firm* — Maginot, Moore & Beck LLP

(57) ABSTRACT

A vacuum operated brake booster, comprises a casing including a base defining at least one hole, and at least one tube extending through the casing and configured to receive a screw for fastening the brake booster to a wall of a passenger compartment of a vehicle. The tube defines a rear end with a peripheral fold forming a rear groove, and an extension extending beyond the rear groove, the extension defining a first outer edge and being configured to be folded toward an outer side of the tube to form a crimping lip. The at least one hole is bordered by a recessed ring having a form complementary to that of the rear groove of the rear end of the at least one tube. The extension is configured to be folded above a second outer edge of the recessed ring and blocked in the groove.

2 Claims, 3 Drawing Sheets

(51) Int. Cl.
*F16B 4/00* (2006.01)
*F16B 7/00* (2006.01)
*F16B 11/00* (2006.01)

(52) U.S. Cl.
CPC ............... *F16B 7/00* (2013.01); *F16B 11/00* (2013.01); *Y10T 29/49909* (2015.01); *Y10T 403/7007* (2015.01)

(58) Field of Classification Search
USPC ........................................................ 91/376 R
See application file for complete search history.

(56) References Cited

U.S. PATENT DOCUMENTS

| | | | |
|---|---|---|---|
| 6,623,048 B2 * | 9/2003 | Castel | B21K 25/00 285/20 |
| 2002/0144594 A1 * | 10/2002 | Castel | B60T 13/567 92/169.3 |
| 2002/0171239 A1 | 11/2002 | Castel et al. | |
| 2007/0089601 A1 | 4/2007 | Sexton et al. | |

* cited by examiner

VACUUM BRAKE BOOSTER PROVIDED WITH TUBES FOR FIXING SCREWS TO PASS THROUGH AND METHOD FOR PRODUCING SAME

This application is a 35 U.S.C. §371 National Stage Application of PCT/EP2013/075168, filed on Nov. 29, 2013, which claims the benefit of priority to Serial No. FR 1261464, filed on Nov. 30, 2012 in France, the disclosures of which are incorporated herein by reference in their entirety.

The present disclosure relates to a vacuum operated brake booster, through the casing of which there extend tubes for the introduction of the screws for fixing the brake booster to the wall of the passenger compartment of the vehicle, each tube being fixed by crimping by means of the rear end thereof in a hole of the base of the casing.

The disclosure also relates to a method for producing such a vacuum operated brake booster.

BACKGROUND

There is already known such a vacuum operated brake booster which is provided with tubes for the introduction of fixing screws, at the same time holding the master cylinder in a dismountable manner separately on the brake booster.

Such a brake booster is described in the document EP2058195, of which FIG. 2C which is included here as FIG. 5 shows the introduction tube of a vacuum operated brake booster according to the prior art; the reference numerals used in FIG. 2C are included here by way of a reminder.

In FIG. 5, the tube 222 for introduction of the screw is fixed to the base 213 by the fold 240 thereof forming an abutment surface. The cover 215 is fixed near the other end of the introduction tube by means of a washer 230 which presses on an axial abutment which is in the form of a fold and which is produced at this location of the introduction tube 222. Beyond the cover 215, the introduction tube comprises an outer threaded zone which receives a sleeve which increases the diameter and which extends through the leg 203 of the master cylinder. The sleeve 232 has an outer thread for receiving a nut 234 which fixes the leg 203 to the sleeve.

The brake booster is fixed by means of the screw 220 whose head 221 of reduced diameter presses against the end 232 of the sleeve. The threaded portion 236 extends through the wall of the engine compartment in order to be fixed by a nut which is not illustrated.

SUMMARY

An object of the present disclosure is to improve the structure of the casing of the brake booster by crimping the rear end of the screw introduction tubes to the base of the casing of the vacuum operated brake booster To this end, the present disclosure relates to a vacuum operated brake booster of the type defined above, wherein
the rear end of the tube has:
a peripheral fold forming a rear groove,
an extension of the tube beyond the peripheral groove in order to be folded toward the outer side and to form a crimping lip,
the base of the casing having a hole which receives the rear end of the tube,
the hole being bordered by a recessed ring which has a form complementary to that of the groove of the tube with an outer edge which moves against the outer edge of the rear groove and an inner edge which moves against the extension of the tube,
the extension being folded against the recessed ring of the base by means of crimping.

That brake booster has the advantage of producing a particularly reliable and effective crimping of the rear end of the screw introduction tubes in the base of the casing of the brake booster. The residual collar of the crimping of the prior art is avoided and the spatial requirement of the assembly is thereby reduced. The production also prevents the formation of metal chips during the crimping, which chips would risk damaging the brake booster or the assembly line. That crimping keeps the superficial protection of the crimped component intact.

According to another advantageous feature, the disclosure relates to a method for producing a vacuum operated brake booster of the type defined above, wherein
the rear end of the tube is prepared by forming a peripheral fold with a rear groove which is open toward the rear and an extension beyond the peripheral groove is left,
a hole which is intended to receive the rear end of the tube is produced in the base of the casing, that hole being bordered with a recessed ring which has a form complementary to that of the groove which is produced on the tube, that recessed ring projecting inside the base and having an outer edge which has a form complementary to that of the outer edge of the rear groove,
the tube is installed via its rear end against the inner face of the base, against the recessed ring, causing the extension of the tube to move through the hole,
a crimping counter-abutment is positioned against the front side of the fold of the tube which is installed in the hole of the base, then a crimping spindle of the crimping tool is introduced into the tube, passing via the extension, and finally the face of the crimping tool surrounding the spindle is compressed against the extension in order to fold it over the edge of the hole, at the outer side, in order to crimp the rear end of the tube on and in the cover.

That method has the advantage of a crimping operation which is very simple to carry out on an introduction tube, which is prepared and which ensures the crimping by means of the large crimping surface between the rear end of the tube and the edge of the hole of the base of the casing through which the end of the tube extends.

BRIEF DESCRIPTION OF THE DRAWINGS

The present disclosure will be described in greater detail below with reference to an embodiment of a vacuum operated brake booster according to the disclosure which is illustrated schematically in the appended drawings, in which.

DETAILED DESCRIPTION

Figure 1:
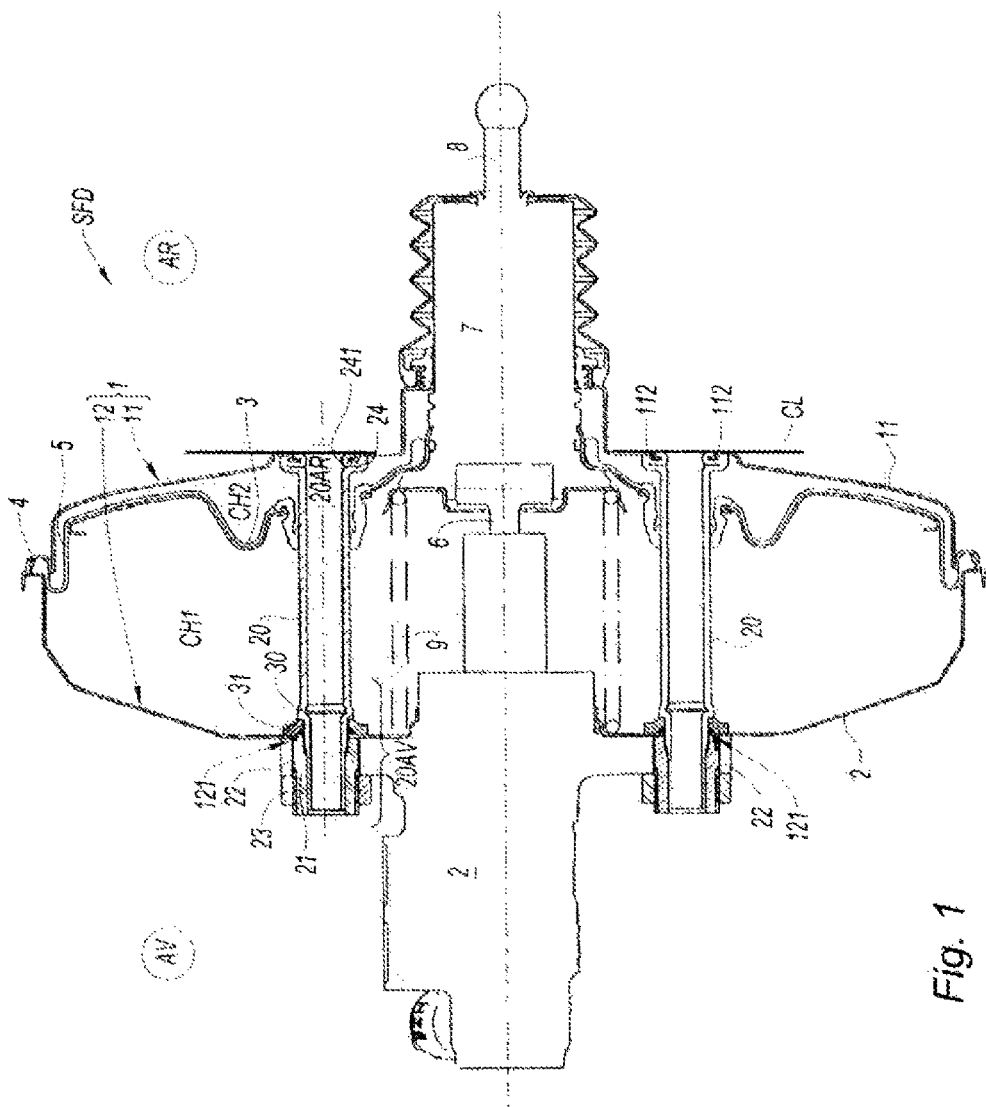
FIG. 1 is an axial cross-section of the brake booster according to the disclosure in the region of the two introduction tubes of the fixing screws which are not illustrated.

According to FIG. 1, the disclosure relates to a vacuum operated brake booster SFD which is composed of a vacuum type casing 1 which is associated with a master cylinder 2 and which is formed by a base 11 which is connected to a cover 12 with interposition of a rigid piston 3 which is connected to the peripheral crimping region 4 of the base 11 and the cover 12 by a diaphragm 5 so as to delimit at one side and the other of the piston 3 a chamber CH1, CH2, each being initially depressurized; the chamber CH2 is placed at atmospheric pressure during braking in order to produce the thrust which acts on the thrust rod 6 actuating the master cylinder 2 such as a tandem master cylinder. The pneumatic control of the brake booster is brought about by a set of valves 7 which are not shown in detail and which are actuated by the control rod 8 which is itself connected by a rod system to the brake pedal (not illustrated). The movement of the control rod 8 actuates the brake booster.

The master cylinder 2 is fixed to the brake booster SFD and the assembly brought together in this manner is fixed to the wall CL which separates the engine compartment (AV) and the passenger compartment (AR) of the vehicle. That allows a definition of the front AV and rear AR in relation to the wall CL in accordance with the orientation of the vehicle. The fixing is brought about in known manner by screws which extend through the casing 1 of the brake booster in tubes 20 which are fixed to the casing 1. Those tubes 20 also extend through the piston 3, ensuring the tightness of the chambers. The casing 1 generally comprises two tubes 20 and thus receives two screws which are provided with a nut to be fixed to the wall CL.

Each tube 20 which is used for the introduction of the screw is fixed to the base 11 of the casing 1 and receives in abutment the cover 12; the screw also serves to fix the master cylinder 2 by the two legs 22 thereof, through each of which a tube 20 extends.

The front end 20AV of the tube 20 is provided at the inner side of the casing, directed toward the cover 12, with a fold which forms a collar 30 which acts as an abutment for a washer 31 in order to receive the cover 12. At the outer side of the cover 12, the end 20AV carries a sleeve 21 which extends through the leg 22 of the master cylinder 2 and the nut 23 which is screwed to the threaded front end 21AV of the tube 20.

The rear end 20AR of the tube 20, at the wall CL side, is crimped to the base 11 of the casing 1 of the brake booster.

The other elements of the brake booster SFD which are generally known are not described in detail.

According to FIG. 1, the two tubes 20 for the introduction of the fixing screw in the casing 1 of the vacuum operated brake booster are fixed, at the rear side, by a crimping action which is described in detail in FIGS. 2A-4B. Since the tubes and crimping operations are identical, the description will be limited to the crimping of one of the tubes, the one in the lower half of the sectional view of FIG. 1.

Figure 2A:
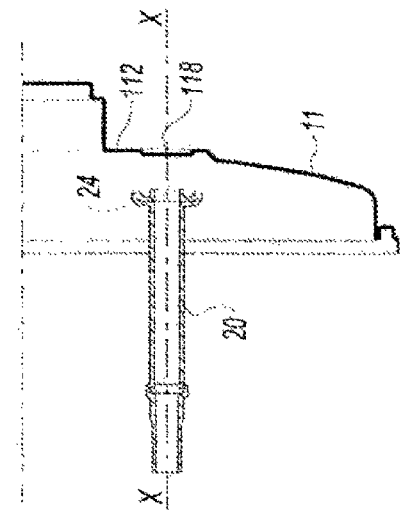
FIG. 2A shows a half-section of the base of the casing depicting the crimping step of positioning the rear end of the tube against the inner face of the cover of the casing.
Figure 2B:
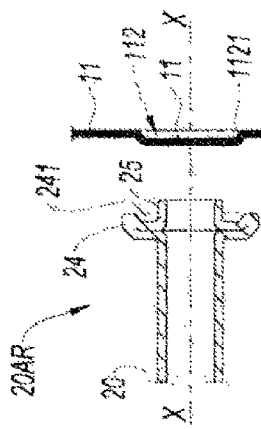
FIG. 2B shows a partial, enlarged sectional view of the casing and tube of FIG. 2A

According to FIGS. 2A, 2B, the rear end 20AR of the tube 20 comprises a peripheral fold 24 which forms a rear groove 241 and which leaves an extension 25 of the tube beyond the peripheral groove 241 in the direction of the axis XX of the tube. That peripheral fold 24 with the groove 241 as well as the other changes and formations of the tube 20 are brought about before the crimping operation which will be described below.

The tube 20 prepared in this manner is installed in the associated hole 111 of the base 11 of the casing 1. That hole 111 is bordered by a recessed ring 112 in relation to the rear plane which constitutes the abutment surface of the base 11 against the wall CL; the central portion of the vacuum operated brake booster with the set of valves 7 thereof extends through a hole 113 having suitable dimensions in the wall 11 in order to be connected by a rod system to the brake pedal.

The hole 111 with the recessed ring 112 has its concavity directed toward the rear AR. The form of the recessed ring 112 with the edge 1121 thereof corresponds to the form of the rear groove 241 of the tube 20 so that, when the tube is engaged in the hole 112, the end sleeve 25 extends through the hole 111 and the edge of the recessed ring 112 of the base 11 is received in the rear groove of the peripheral fold 24.

Figure 3A:
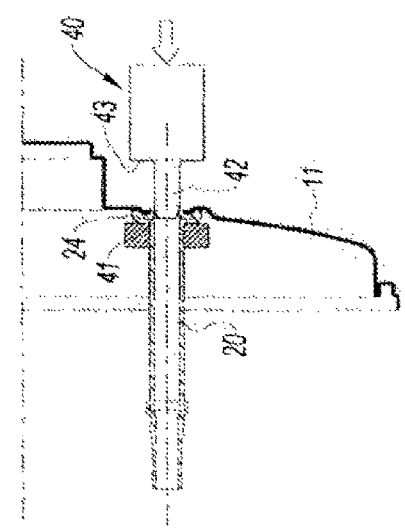
FIG. 3A shows a half-section of the base of the casing depicting the crimping step of positioning of the spindle of the crimping tool in the end of the tube.
Figure 3B:
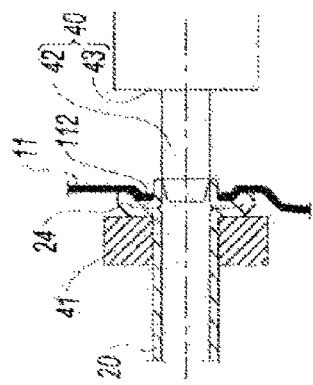
FIG. 3B shows a partial, enlarged sectional view of the casing and tube of FIG. 3A.
Figure 4A:
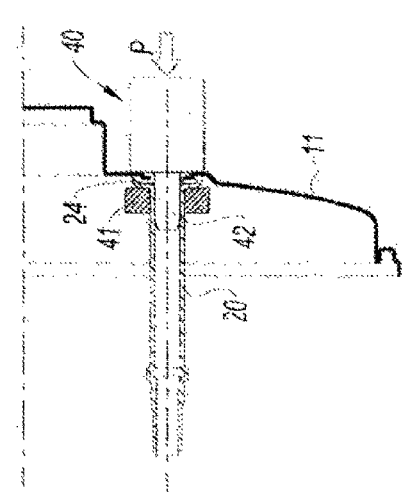
FIG. 4A shows a half-section of the base of the casing at the end of the crimping operation.
Figure 4B:
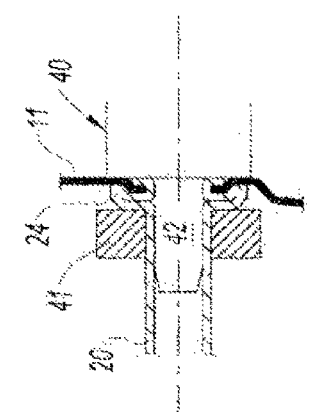
FIG. 4B shows a partial, enlarged sectional view of the casing and tube of FIG. 4A.
Figure 5:
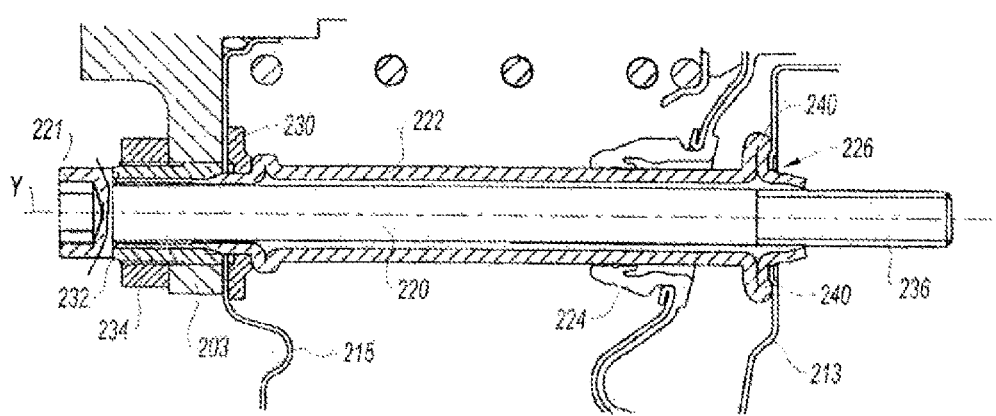
FIG. 5 is a cross-section of a previous brake booster.

That position of the fold 24 and the hole 111 with the recessed ring 112 is illustrated in FIGS. 3A, 3B.

At that time, the crimping counter-abutment which is illustrated in the form of a ring 41 which is engaged on the tube 20 and which is in abutment against the front side of the fold 24 is positioned; the spindle 42 of the crimping tool 40 begins to become engaged in the tube 20.

Under the effect of the thrust P (FIG. 4A, 4B), the crimping tool 40 with the abutment surface 43 thereof pulls down the end sleeve 25 over the edge of the hole 111 of the base 11 so as to crimp the rear end of the tube 20 in and on the hole 111 of the base 11 of the casing 1.

The tube 20, in fact the two tubes since the crimping is preferably carried out simultaneously, is/are thereby fixed to the base 11 of the casing 1. The casing is then ready to receive the system of valves 7 with the control rod 8 and the piston 3 which carries the diaphragm 5.

In the following production step of the vacuum operated brake booster (FIG. 1), there is installed the cover 12 on the front end 20AV of the two tubes 20 through two openings 121 of the cover 12, then the sleeve 21 is screwed externally on the threaded front end of each tube 20 in order to block the cover 12 against the abutment washer 31 which is in abutment against the fold 30 of each tube at the same time as the cover 12 is crimped to the base 11 of the casing 1 with the edge of the diaphragm 5 being interposed so as to finish the assembly of the casing 1.

In the following step, there is installed the master cylinder 2 whose two legs 22 which are provided with a respective bore are engaged on the sleeves 21 which are themselves threaded at the outer side in order to clamp the legs 22 of the master cylinder 2 by nuts 23 against the outer face of the cover 12 of the casing 1.

That assembly, also with the positioning, for example, of the return spring 9 and other elements which constitute the vacuum operated brake booster assembly and the master cylinder and which are not described in detail are received inside the compartment formed by the casing 1. The assembly is then ready to be installed in a vehicle and to be fixed to the wall CL which separates the passenger compartment and the engine compartment by nut type screws which extend through the two tubes 20.

LIST OF REFERENCE NUMERALS

SFD vacuum operated brake booster
CH1, CH2 compartment of the casing

XX axis of the brake booster
1 reduced pressure casing
11 base
111 hole
112 recessed ring
1121 edge
113 introduction of set of valves 7
12 cover
2 master cylinder
20 tube
20AV front end
20AR rear end
21 sleeve
22 leg of master cylinder
23 nut
24 fold
241 peripheral groove
25 extension/end sleeve
30 fold forming collar
31 abutment washer
3 rigid piston
4 peripheral crimping of the casing
5 diaphragm
6 thrust rod
7 set of valves
8 control rod
9 return spring of piston

The invention claimed is:

1. A vacuum operated brake booster, comprising:
a casing including a base defining at least one hole;
at least one tube extending through the casing and being configured to receive a screw for fastening the brake booster to a wall of a passenger compartment of a vehicle, the at least one tube defining a rear end and being configured to be fixed to the casing by crimping the rear end thereof in the at least one hole,
wherein the rear end of the at least one tube has a peripheral fold forming a rear groove, and an extension extending beyond the rear groove, the extension defining a first outer edge and being configured to be folded toward an outer side of the tube to form a crimping lip,
wherein the at least one hole is bordered by a recessed ring having a form complementary to that of the rear groove of the rear end of the at least one tube, the recessed ring defining a second outer edge configured to move against the first outer edge of the rear groove of the at least one tube and an inner edge configured to move against the extension of the at least one tube, and
wherein the extension is configured to be folded above the second outer edge of the recessed ring and blocked in the groove.

2. A method for producing a vacuum operated brake booster that includes (i) a cover, and (ii) a casing defining at least one hole, and (iii) at least one tube extending through the at least one hole of the casing and configured to receive a screw for fastening the brake booster to a wall of a passenger compartment of a vehicle, the at least one tube defining a rear end and configured to be fixed to the casing by crimping the rear end thereof in the at least one hole, the method comprising:
forming in the at least one tube a peripheral fold with a rear groove which is open toward a rear side of the tube and an extension extending beyond the rear groove, the rear groove defining a first outer edge,
forming in the base at least one hole configured to receive the rear end of the tube, the at least one hole being bordered with a recessed ring having a form complementary to that of the rear groove of the at least one tube, the recessed ring projecting inside the base and defining a second outer edge which has a form complementary to that of the first outer edge of the rear groove of the at least one tube,
installing the at least one tube with the rear end of the at least one tube pressed against an inner face of the base, and against the recessed ring, causing the extension of the at least one tube to move through the hole,
positioning a crimping counter-abutment against a front side of the peripheral fold of the tube which is installed in the hole of the base,
introducing a crimping spindle of a crimping tool into the at least one tube, passing via the extension, and
compressing a face of the crimping tool surrounding the spindle against the extension in order to fold the extension over an edge of the at least one hole at an outer side in order to crimp the rear end of the at least one tube on and in the cover.

* * * * *